(12) United States Patent
Connolly

(10) Patent No.: US 6,799,664 B1
(45) Date of Patent: Oct. 5, 2004

(54) DRUM BRAKE ASSEMBLY

(75) Inventor: Frank Connolly, Berkley, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/113,436

(22) Filed: Mar. 29, 2002

(51) Int. Cl.$^7$ .............................................. F16D 51/00
(52) U.S. Cl. ........................................ 188/337; 188/328
(58) Field of Search ................................. 188/337, 328, 188/327, 336

(56) References Cited

U.S. PATENT DOCUMENTS

| | | | | |
|---|---|---|---|---|
| 500,611 A | * | 7/1893 | Radford | 188/328 |
| 1,478,969 A | * | 12/1923 | Leitzell | 188/328 |
| 1,495,718 A | * | 5/1924 | Sheridan | 188/328 |
| 1,508,577 A | * | 9/1924 | Roberts | 188/328 |
| 1,739,783 A | * | 12/1929 | Christensen | 188/106 A |
| 1,885,174 A | * | 11/1932 | Bowen et al. | 188/79.59 |
| 1,942,044 A | * | 1/1934 | Bell | 188/328 |
| 2,065,292 A | * | 12/1936 | Schnell | 188/337 |
| 2,146,287 A | * | 2/1939 | Darmstaetter | 188/337 |
| 2,226,457 A | * | 12/1940 | Whittingham | 188/359 |
| 3,820,638 A | * | 6/1974 | Ebey | 188/206 A |
| 4,552,254 A | * | 11/1985 | Baltare | 188/328 |
| 5,096,027 A | * | 3/1992 | Kobayashi et al. | 188/328 |

* cited by examiner

Primary Examiner—Robert A. Siconolfi
(74) Attorney, Agent, or Firm—MacMillan, Sobanski & Todd, LLC

(57) ABSTRACT

This invention relates to a vehicle drum brake assembly adapted to selectively frictionally engage a brake drum. The drum brake assembly includes a backing plate supported relative to a vehicle component and having at least three openings formed therethrough, at least one brake shoe supported on the backing plate for selective movement into frictional engagement with the brake drum, and a brake mechanism for selectively moving the brake shoe into frictional engagement with the brake drum. The drum brake assembly includes a pair of fasteners extending through two of the three openings provided in the backing plate to secure the backing plate to a fixed, non-rotatable component of the vehicle. The drum brake assembly further includes a member having a first portion operatively connected to the brake shoe and a second portion extending through the third of the three openings provided in the backing plate and secured to the fixed, non-rotatable component of the vehicle, wherein during application of the drum brake assembly the member is operative to transfer braking torque from the brake shoe to the non-rotatable component of the vehicle.

11 Claims, 6 Drawing Sheets

DRUM BRAKE ASSEMBLY

BACKGROUND OF THE INVENTION

This invention relates in general to vehicle drum brake assemblies and in particular to an improved mounting system for such a vehicle drum brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing or steering knuckle, by a plurality of fasteners or bolts. Typically, four bolts extend through the backing plate to secure the backing plate to a flange of the axle housing. A pair of opposed arcuate brake shoes are supported on the backing plate for selective movement relative thereto. Each of the brake shoes has a friction pad secured thereto. The drum brake assembly further includes a cylindrical brake drum which is secured to the vehicle wheel for rotation therewith. The interior of the brake drum is hollow, defining an inner cylindrical braking surface. The brake drum is disposed adjacent to the backing plate such that the brake shoes extend within the inner cylindrical braking surface. To effect braking action, the brake shoes are moved outwardly apart from one another such that the friction pads frictionally engage the inner cylindrical braking surface of the brake drum. Such frictional engagement causes slowing or stopping of the rotational movement of the brake drum and, therefore, the wheel of the vehicle in a controlled manner.

One or more actuating mechanisms are provided in the drum brake assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulically actuated wheel cylinder having a pair of opposed pistons which abut and move the brake shoes apart from one another into frictional engagement with the cylindrical braking surface of the brake drum.

A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

SUMMARY OF THE INVENTION

This invention relates to a vehicle drum brake assembly adapted to selectively frictionally engage a brake drum. The drum brake assembly includes a backing plate supported relative to a vehicle component and having at least three openings formed therethrough, at least one brake shoe supported on the backing plate for selective movement into frictional engagement with the brake drum, and a brake mechanism for selectively moving the brake shoe into frictional engagement with the brake drum. The drum brake assembly includes a pair of fasteners extending through two of the three openings provided in the backing plate to secure the backing plate to a fixed, non-rotatable component of the vehicle. The drum brake assembly further includes a member having a first portion operatively connected to the brake shoe and a second portion extending through the third of the three openings provided in the backing plate and secured to the fixed, non-rotatable component of the vehicle, wherein during application of the drum brake assembly the member is operative to transfer braking torque from the brake shoe to the non-rotatable component of the vehicle.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
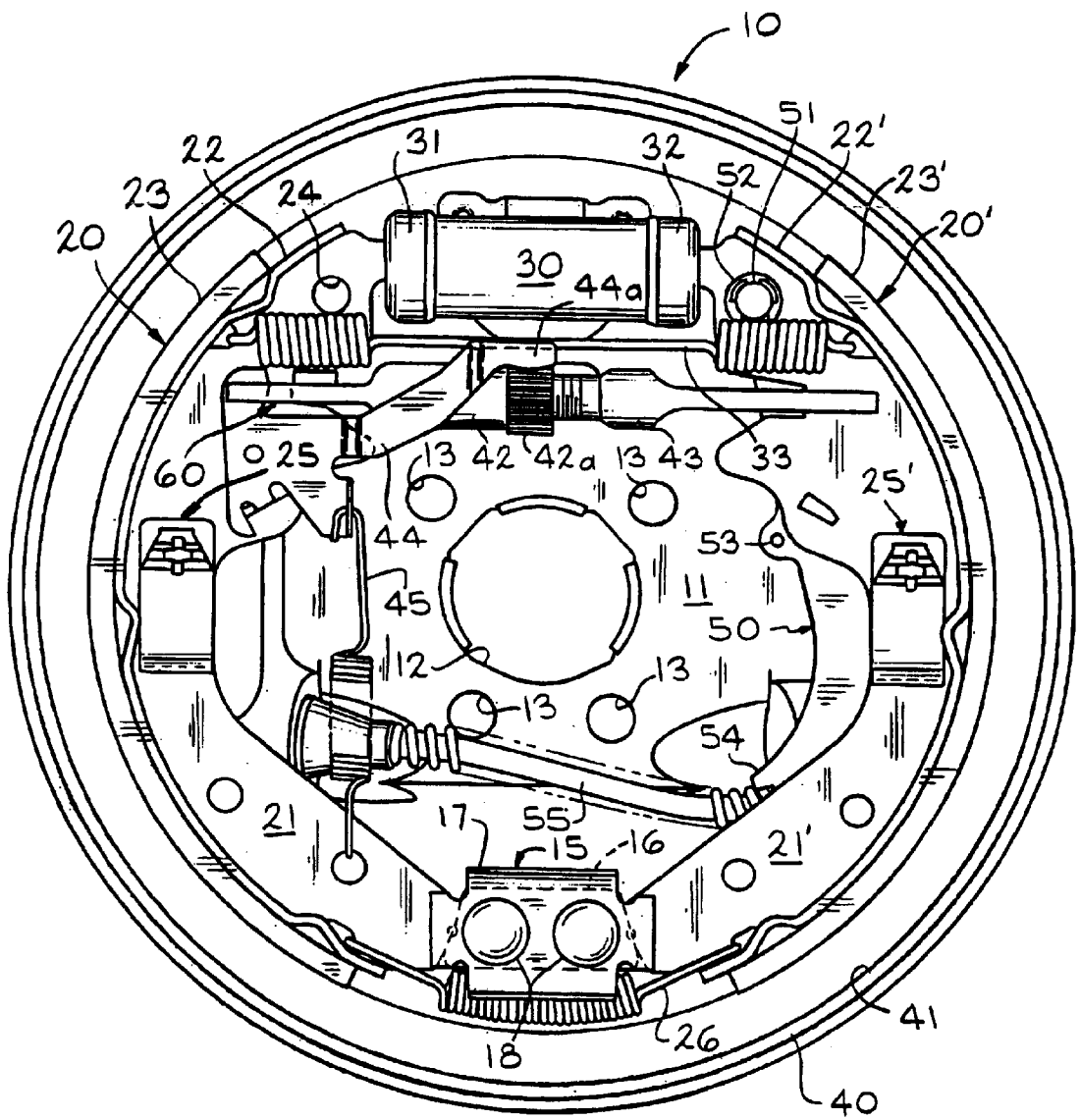
FIG. 1 is a plan view of a portion of a prior art drum brake assembly.

Referring now to the drawings, there is illustrated in FIG. 1 a portion of a prior art drum brake assembly, indicated generally at 10. The illustrated prior art drum brake assembly 10 is associated with a left rear wheel (not shown) of a vehicle. The general structure and operation of the prior art drum brake assembly 10 is conventional in the art. Thus, only those portions of the prior art drum brake assembly 10 which are necessary for a full understanding of this invention will be explained and illustrated in detail. Although this invention will be described and illustrated in conjunction with the particular vehicle drum brake assembly 10 disclosed herein, it will be appreciated that this invention may be used in conjunction with other drum and disc brake assemblies including a vehicle drum-in-hat type of disc brake assembly.

The illustrated prior art drum brake assembly 10 includes a rigid backing plate 11 which is generally flat and circular in shape. The backing plate 11 is adapted to be secured to a fixed, non-rotatable component of the vehicle, such as an outer end or flange of an axle housing (not shown) for enclosing a rotatable axle. To accomplish this, a relatively large opening 12 is formed through a central portion of the backing plate 11. The central opening 12 is provided to permit the outer end of the rotatable axle to extend therethrough to the driven vehicle wheel (not shown). A plurality of relatively smaller holes 13 are also formed through the backing plate 11, located about the central opening 12. The smaller holes 13 are provided to permit threaded bolts (not shown) to extend therethrough to secure the backing plate 11 to the outer end or flange of the axle housing or steering knuckle.

An abutment block assembly or reaction member, indicated generally at 15, is provided on an outer surface of the backing plate 11. The abutment block assembly 15 includes an inner spacer plate 16, which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The prior art drum brake assembly 10 further includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the opposed outer curved surfaces of the web portions 21 and 21', such as by welding. A friction pad 23 is secured to the outer arcuate surface of the table portion 22 of the brake pad 20, while a friction pad 23' is secured to the outer arcuate surface of the table portion 22' of the brake pad 20'. A circular aperture 24 is formed through the upper end of the web portion 21 of the brake shoe 20 and through the upper end of the web portion 21' of the brake shoe 20'.

The first and second brake shoes 20 and 20' are supported on the backing plate 11 by respective pivot pin and spring-clip assemblies, indicated generally at 25 and 25', which are conventional in the art. As shown by the dotted lines in FIG. 1, the lower ends of the web portions 21 and 21' of the brake shoes 20 and 20', respectively, are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings 27 formed through the lower ends of the web portions 21 and 21' so as to urge such lower ends thereof into abutment with the opposed side surfaces of the spacer plate 16.

The prior art drum brake assembly 10 includes a service brake mechanism for actuating the drum brake assembly 10 under normal operating conditions. The service brake mechanism includes a hydraulically actuated wheel cylinder 30 which is disposed between the upper ends of the web portions 21 and 21' of the brake shoes 20 and 20', respectively. The wheel cylinder 30 includes a mounting plate 31 having a pair of threaded openings 31a formed therein. A pair of bolts (not shown) extend through a pair of openings (not shown) provided in the backing plate 11 and threaded ends thereof are received in the threaded openings of the mounting plate 31 to secure the wheel cylinder 30 to the backing plate 11.

The wheel cylinder 30 includes a pair of opposed piston assemblies 32a and 32b which respectively abut the upper ends of the web portions 21 and 21' of the brake shoes 20 and 20'. A second coiled spring 33 has hooked ends which extend through respective openings 28 formed through the upper ends of the web portions 21 and 21' of the brake shoes 20 and 20', respectively, so as to urge such upper ends thereof into abutment with the pistons 32a and 32b. The wheel cylinder 30 is connected to a conventional source of pressurized hydraulic or pneumatic fluid (not shown) for operating the prior art drum brake assembly 10 under normal operating conditions.

The prior art drum brake assembly 10 further includes a hollow cylindrical brake drum 40 which is secured to a wheel (not shown) of the vehicle for rotation therewith. The interior of the brake drum 40 defines a cylindrical braking surface 41. When installed, the brake drum 40 is disposed adjacent to the backing plate 11 such that the brake shoes 20 and 20' extend within the cylindrical braking surface 41. To effect braking action, the brake shoes 20 and 20' are moved outwardly apart from one another so as to frictionally engage the cylindrical braking surface 41 of the brake drum 40. Such frictional engagement causes slowing or stopping of the rotational movement of the brake drum 40 and, therefore, the wheel of the vehicle in a controlled manner.

The hydraulically actuated wheel cylinder 30 is used to operate the drum brake assembly 10 under normal service conditions. When it is desired to actuate the drum brake assembly 10, pressurized hydraulic or pneumatic fluid is supplied to the wheel cylinder 30. Typically, this is accomplished by the operator of the vehicle depressing the brake pedal in the driver compartment of the vehicle. When such pressurized hydraulic or pneumatic fluid is supplied to the wheel cylinder 30, the pistons 32a and 32b are moved apart from one another. As a result, the upper ends of the brake shoes 20 and 20' are also moved apart from one another, essentially pivoting about the abutment block assembly 15. This movement causes the friction pads 23 and 23' of the brake shoes 20 and 20', respectively, to move into frictional engagement with the cylindrical braking surface 41 of the brake drum 40. The abutment block assembly 15 functions as the reaction member to transfer the braking torque from the leading brake shoe (i.e., the left brake shoe 20 when the brake drum 40 is rotating in a counter-clockwise direction) to the frame of the vehicle. When the brake shoes 20 and 20' are moved apart from one another, the second coiled spring 33 is expanded. Thus, when the pressurized hydraulic or pneumatic fluid to the hydraulic actuator 30 is subsequently released, the second coiled spring 33 retracts the brake shoes 20 and 20' inwardly toward one another and out of frictional engagement with the cylindrical braking surface 41 of the brake drum 40.

The prior art drum brake assembly 10 also includes an automatic adjusting mechanism to compensate for thinning of the friction pads 23 and 23' of the brake shoes 20 and 20', respectively, resulting from wear caused by repeated use. The illustrated automatic adjusting mechanism is conventional in the art and includes a pair of struts 42 and 43 having opposed slotted ends. The upper ends of the web portions 21 and 21' of the brake shoes 20 and 20', respectively, are received within the slotted ends of the struts 42 and 43. A star wheel portion 42a is threaded onto the strut 42. An adjuster lever 44 is pivotally mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portion 21 so as to urge the protruding arm portion 44a of the adjuster lever 44 into engagement with the star wheel portion 42a of the strut 42.

As is known, when the brake shoes 20 and 20' are moved outwardly apart from one another such that the friction pads 23 and 23', respectively, frictionally engage the cylindrical braking surface 41 of the brake drum 40, the adjusting lever 44 is pivoted. When a sufficient amount of wear has occurred on the friction pads 23 and 23', the adjusting lever 44 will be pivoted a sufficient amount so as to rotate the star wheel portion 42a relative to the struts 42 and 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance between the friction pads 23 and 23' of the brake shoes 20 and 20', respectively, and the cylindrical braking surface 41 of the brake drum 40 as wear occurs during operation of the prior art drum brake assembly 10.

In addition to the service brake mechanism described above, the prior art drum brake assembly 10 further includes a mechanically actuated parking and emergency brake mechanism. The parking and emergency brake mechanism includes an actuating lever, indicated generally at 50. The actuating lever 50 is pivotally supported on the web 21' of brake shoe 20' by a pivot pin assembly which includes a pivot pin 51 having an enlarged head and a reduced diameter body. The body of the pivot pin 51 is inserted through respective aligned apertures formed through the actuating lever 50 and the web portion 21' of the brake shoe 20'. An E-clip 52 is installed in a groove formed about the end of the body of the pivot pin 51 to retain it in the apertures such that the actuating lever 50 is pivotally supported on the brake shoe 20'.

The actuating lever 50 further includes an upstanding pin 53, and a hooked lower end portion 54. The hooked end portion 54 facilitates the connection of one end of an actuating cable 55 thereto. The actuating cable 55 is conventional in the art and is connected to a hand operated lever (not shown) or similar manually operable parking and emergency brake mechanism for selectively actuating the drum brake assembly 10. The construction of the prior art drum brake assembly 10 thus far described is conventional in the art.

Figure 2:
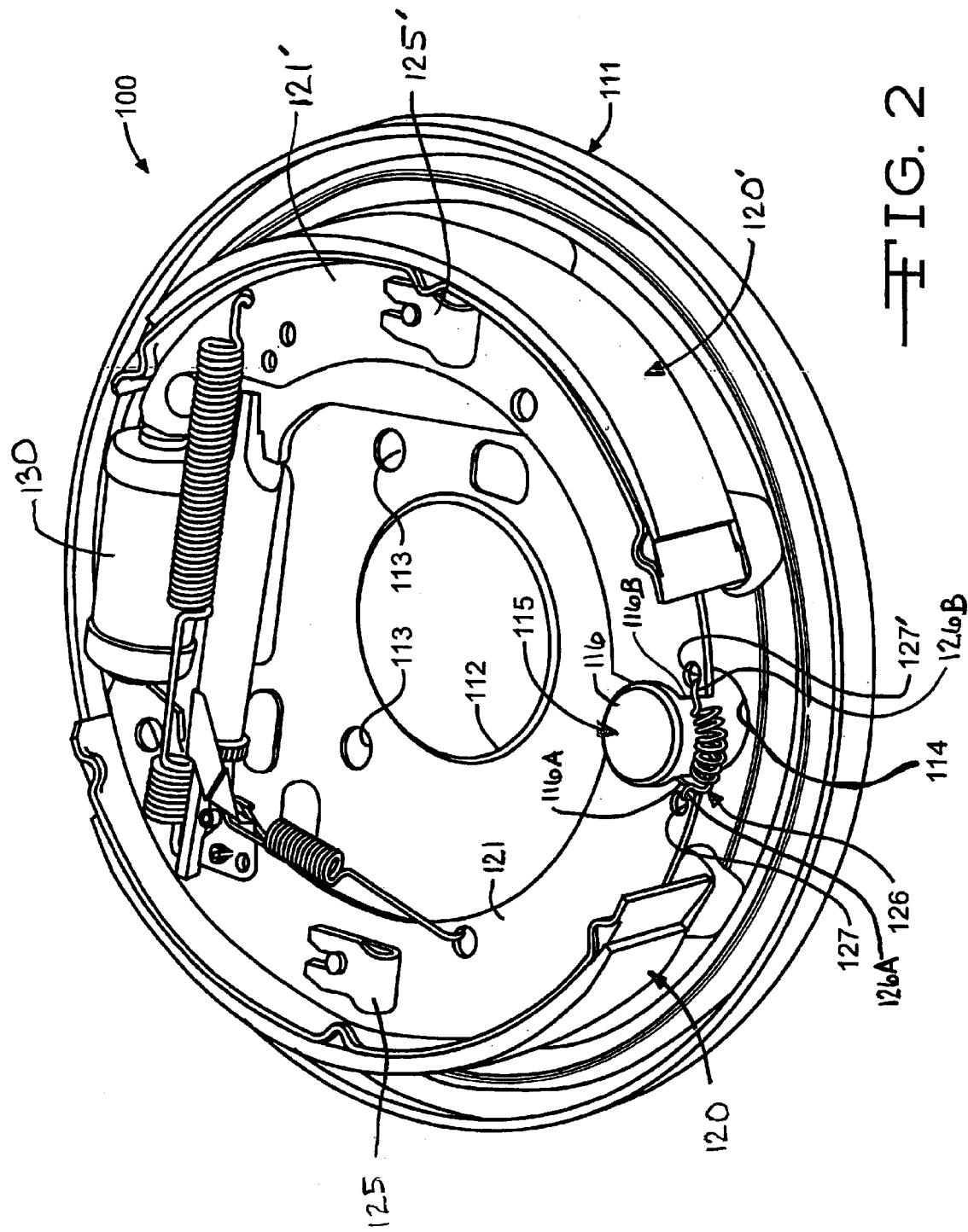
FIG. 2 is a plan view of a first embodiment of a drum brake assembly in accordance with this invention, the drum brake assembly in this embodiment including two separate brake shoes and a separate reaction member.
Figure 3:
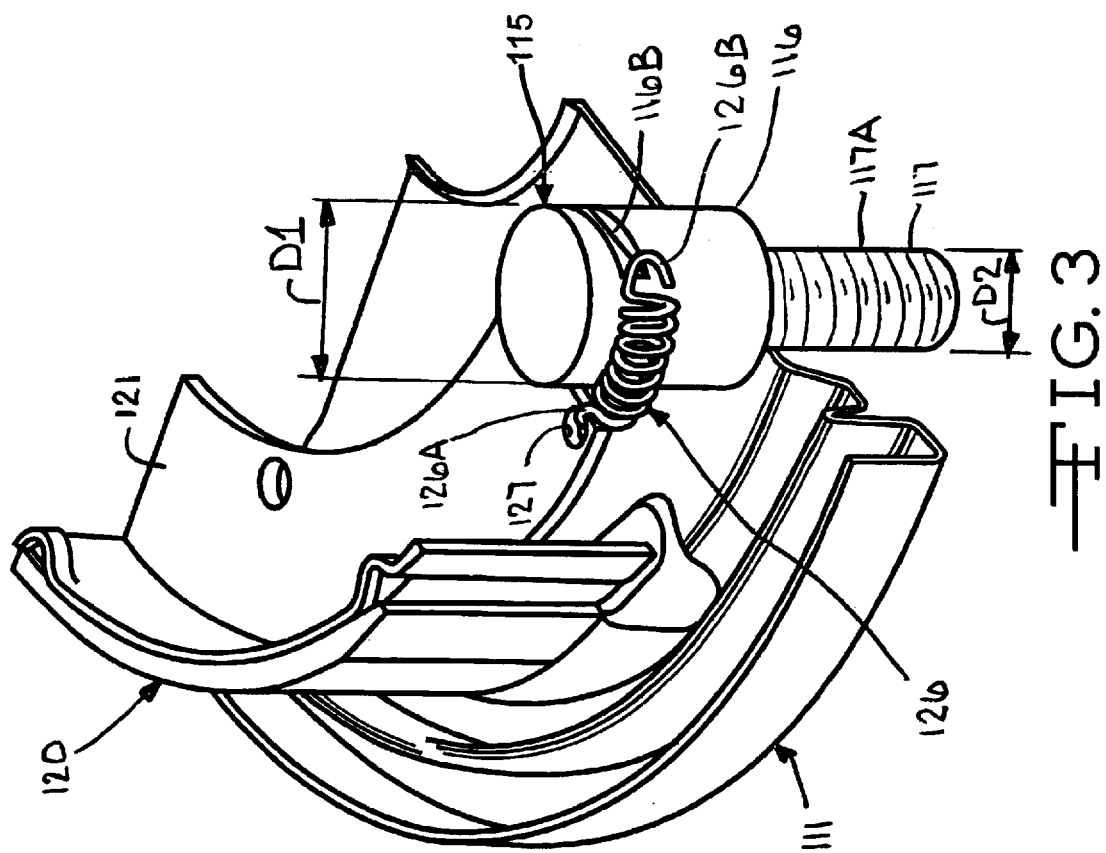
FIG. 3 is a view of a portion of the drum brake assembly illustrated in FIG. 2.

Turning now to FIGS. 2–3 there is illustrated a portion of a first embodiment of a drum brake assembly, indicated generally at 100, in accordance with the present invention. As shown therein, the drum brake assembly 100 includes a rigid backing plate 111 which is generally flat and circular in shape. The backing plate 111 is adapted to be secured to a fixed, non-rotatable component of the vehicle, such as an outer end or flange of an axle housing (not shown) for enclosing a rotatable axle or a steering knuckle (not shown). To accomplish this, a relatively large opening 112 is formed through a central portion of the backing plate 111. The central opening 112 is provided to permit the outer end of the associated vehicle component to extend therethrough to the vehicle wheel (not shown). Also, the brake assembly 100 includes a first brake shoe 120 and a second brake shoe 20' which are supported on the backing plate 111 by respective pivot pin and spring-clip assemblies, indicated generally at 125 and 125', which are conventional in the art.

The backing plate 111 further includes two smaller holes 113 and one larger hole 114 formed therein about the central opening 112. In the embodiment illustrated in FIG. 2, the two smaller holes 113 are formed in an "upper" portion of the backing plate 111 near a wheel cylinder 130, and the one larger hole 114 is formed in a "lower" portion of the backing plate 111. The smaller holes 113 are provided to permit threaded bolts (not shown) to extend therethrough to secure the backing plate 111 to the associated vehicle component in a conventional manner. The larger hole 114 is adapted to receive a unique fastening and reaction member or "multi-function" bolt 115 in accordance with this invention as will be explained below. The bolt 115 is adapted to extend through the larger hole 114 of the backing plate 111 to secure the backing plate 111 to the associated vehicle component.

As shown in FIG. 3, the bolt 115 includes a first portion 116 and a second portion 117. In the illustrated embodiment, the first portion 116 is preferably circular shaped and defines a first outer diameter D1 which is slightly smaller than larger hole 114 of the backing plate 111. The first portion 116 further includes a pair of annular recesses or grooves 116A and 116B formed therein each of which extends around a portion of the circumference thereof. As shown in FIGS. 2 and 3, a curved lower end 121A of a web portion 121 of the brake shoe 120 is disposed in the recess 116A of the bolt 115. Similarly, in a like fashion, an opposite curved lower end 121A' of a web portion 121' of the brake shoe 120' is disposed in the recess 116B of the bolt 115.

The drum brake assembly 100 further includes a coiled spring 126 having hooked ends 126A and 126B which extend through respective openings 127 and 127' formed through the lower ends of the web portions 121 and 121' so as to urge such lower ends thereof into abutment within the recesses 116A and 116B, respectively, of the bolt 116.

In the illustrated embodiment, the second portion 117 defines a second diameter D2 which is less than the first diameter D1 of the first portion and is provided with external threads 117A along the entire length thereof The second portion 117 of the bolt 115 is secured to the associated vehicle component. Preferably, to accomplish this, the second portion 117 extends through an associated opening provided in the vehicle axle flange or steering knuckle and a nut (not shown) is installed thereon to thereby secure the bolt 115, and therefore the lower end of the backing plate 111, to the associated vehicle component. Alternatively, the vehicle component opening could be threaded and the threaded second portion 117 threadably received therein to secure the bolt 115 and backing plate 111 thereto. In this case, the first portion 116 would preferably include a head shape which allowed a tool to be used to rotate the bolt in order to threadably secure the bolt to the vehicle component. Alternatively, the structure of the bolt 115 could be other than illustrated if so desired and/or other suitable means could be used to secure the bolt 115 to the associated vehicle component.

Figure 4:
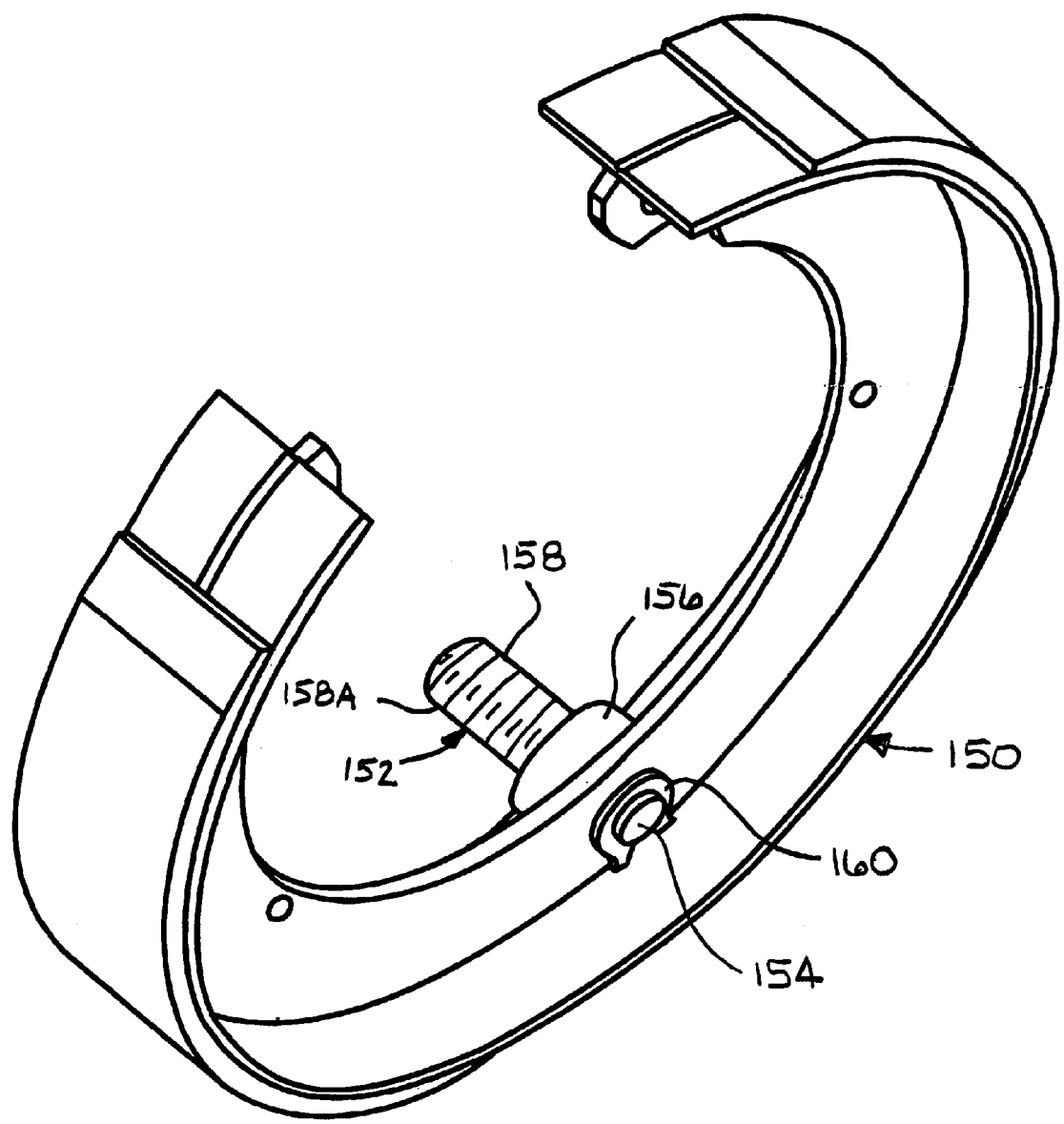
FIG. 4 is view of a second embodiment of a drum brake assembly in accordance with this invention, the drum brake assembly in this embodiment including a one piece brake shoe and a separate reaction member.

FIG. 4 illustrates a second embodiment of a brake shoe 150 and a bolt 152 adapted for use in the drum brake assembly 100 in accordance with the present invention. As shown therein, the brake shoe 150 is a one-piece brake shoe which is formed by a suitable method. Preferably, the brake shoe 150 is formed from steel material during a stamping and then welding process or during a rolling process. Alternatively, the brake shoe 150 can be formed from other suitable materials and/or by other suitable methods.

In this embodiment, the brake shoe 150 includes an opening (not shown) provided therein generally intermediate a lower end portion thereof through which the bolt 152 is disposed. The bolt 152 includes a first or outer end portion 154, a second or intermediate portion 156, and third or inner end portion 158. The first portion 154 is preferably circular in shape and defines a first outer diameter D1 which is slightly smaller than the larger hole 114 of the backing plate 111. The first portion 154 further includes an annular recess or groove (not shown) formed therein which extends preferably around the entire circumference thereof.

The second portion 156 is preferably annular or circular shaped and defines a second outer diameter D2 which is larger than the larger hole 114 of the backing plate 111. A clip or other suitable type of fastener 160 is installed in the recess provided in the first portion 154 of the bolt 152 to secure the bolt 152 to the backing plate 111.

In the illustrated embodiment, the third portion 158 is provided with external threads 158A along the entire length thereof for securing the bolt 152 to the associated vehicle component. Preferably, to accomplish this, the third portion 158 extends through an associated opening provided in the vehicle axle flange or steering knuckle and a nut (not shown) is installed thereon to thereby secure the bolt 152, and therefore the brake shoe 150 and the backing plate 111, to the associated vehicle component. Alternatively, the vehicle component opening could be threaded and the threaded third portion 158 threadably received therein to secure the bolt 152, the brake shoe 150 and the backing plate 111 thereto. In this case, the first portion 154 would preferably include a head shape which allowed a tool to be used to rotate the bolt in order to threadably secure the bolt to the vehicle component. Alternatively, the structure of the bolt 152 could be other than illustrated if so desired and/or other suitable means could be used to secure the bolt 152 to the associated vehicle component and/or to the brake shoe 150.

Figure 5:
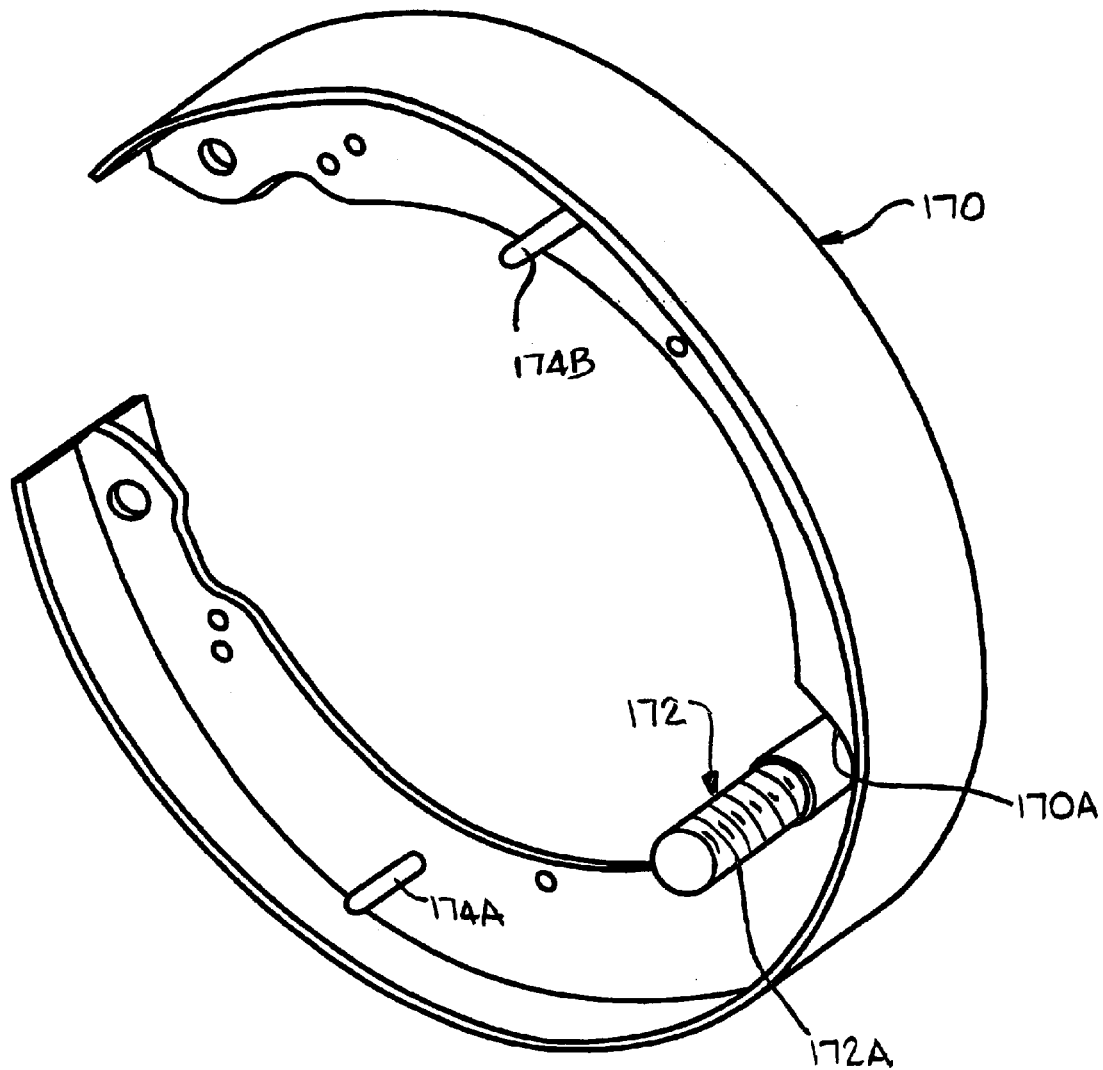
FIG. 5 is view of a third embodiment of a drum brake assembly in accordance with this invention, the drum brake assembly in this embodiment including a one piece brake shoe having an integral reaction member and shoe slide supports.
Figure 6:
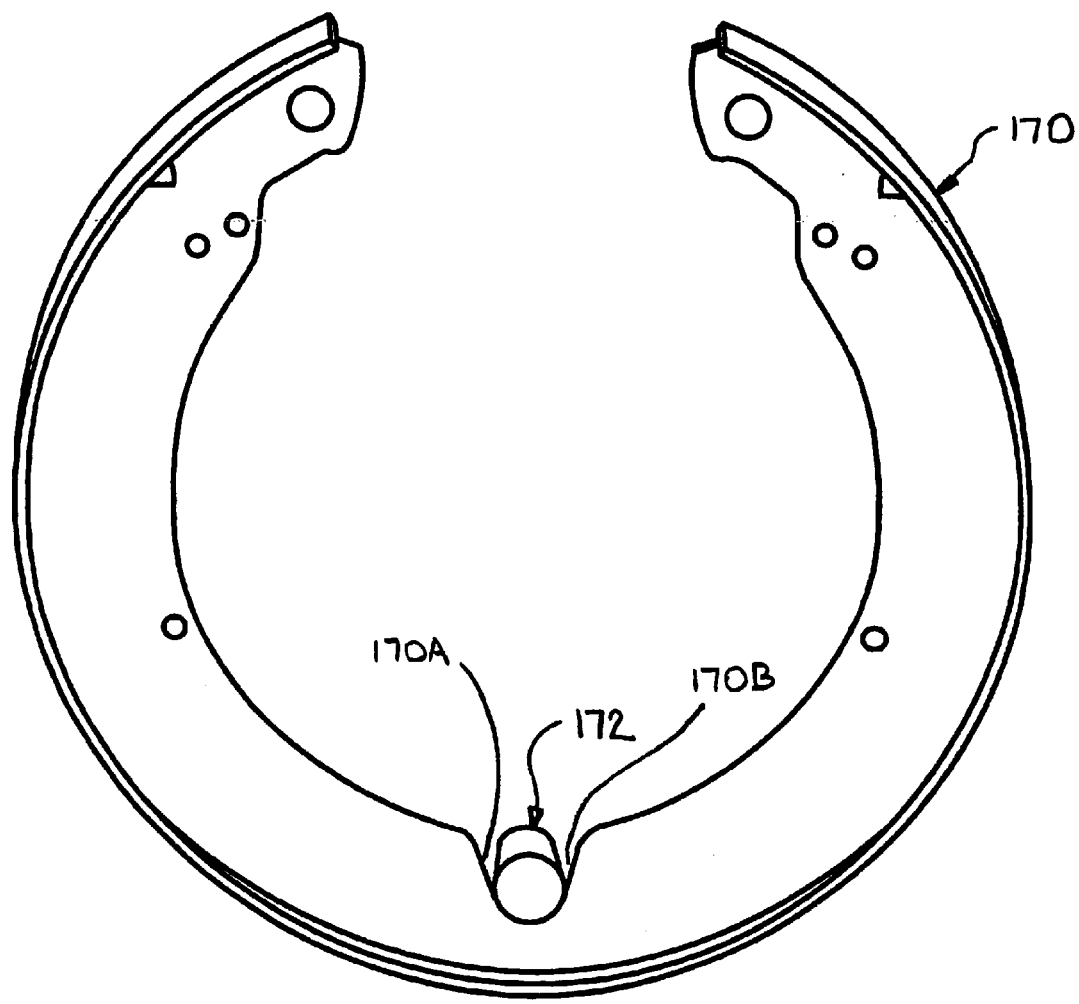
FIG. 6 is another view of the one-piece brake shoe shown in FIG. 5.

Turning now to FIGS. 5 and 6 there is illustrated third embodiment of a brake shoe 170 and a bolt 172 adapted for use in the drum brake assembly 100 in accordance with the present invention. As shown therein, the brake shoe 170 is a one-piece brake shoe which is formed by a suitable method. Preferably, in the illustrated embodiment, the brake shoe 170 is formed from an aluminum material during a semi-solid forging process. Alternatively, the brake shoe 170 can be formed from other suitable materials and/or by other suitable methods. For example, the brake shoe 170 can be formed from steel, aluminum or a composite material during a casting or a forging process.

In this embodiment, the bolt 172 is formed integral with the brake shoe 170 during the shoe forming process. The bolt 172 includes an inner end portion 172A which is provided with threads along at least a portion thereof for securing the bolt 172 to the associated vehicle component Preferably, to accomplish this, the inner end portion 172A extends through an associated opening provided in the vehicle axle flange or steering knuckle and a nut (not shown) is installed thereon to thereby secure the bolt 172, and therefore the brake shoe 170 and the backing plate 111, to the associated vehicle component. Alternatively, the structure of the bolt 172 could be other than illustrated if so desired and/or other suitable means could be used to secure the bolt 172 to the associated vehicle component.

Preferably, the brake shoe 170 further includes a pair of "shoe flex" slots 170A and 170B, as best shown in FIG. 6, and a pair of integrally formed shoe slide supports 174A and 174B, shown in FIG. 5. As shown in the illustrated embodiment, the shoe flex slots 170A and 170B are preferably formed in the web portion of the brake shoe 170 directly adjacent opposed sides of the bolt 172. The shoe flex slots 170A and 170B are effective to provide for adjustment of the brake output characteristics of the brake assembly and/or change of the pressure distribution on the friction pads of the brake assembly. The shoe slide supports 174A and 174B are provided for supporting the brake shoe 170 during sliding movement thereof. Alternatively, the structure of the brake shoe 170 can be other than illustrated and described if so desired. For example, the shoe flex slots 170A and 170B could be other than illustrated or could be eliminated if so desired. Also, the shoe slide supports 174A and 174B could be eliminated and the brake shoe 170 could only include the integrally formed bolt 172 with or without the shoe flex slots 170A and 170B. In this case, the brake shoe 170 would "slide" on raised shoe slide supports (not shown) which are conventional in the art and typically embossed shoe slide supports formed by a stamping operation during the manufacture of the backing plate.

One advantage of the present invention is that the backing plate no longer functions as a structural component of the brake assembly but rather functions as a dust shield and/or mounting plate and can be made out of a thinner and/or lighter weight material. As a results of this, there is a weight and cost savings. Also, the shoe flex slots provided in the brake shoe of the present invention can provide an almost infinite change in the brake output characteristics of the associated brake assembly and/or change of the pressure distribution on the friction pads of the brake assembly.

Although this invention has been described and illustrated in connection with a particular prior art drum brake assembly 10 illustrated in FIG. 12, it will be appreciated that this invention may be used in connection with other drum brake assemblies. For example, this invention may be used in a "duo-servo" type of drum brake assembly, in a "dual mode" drum brake assembly, wherein the service brake is of the leading/trailing type and the parking and emergency brake is of the duo-servo type. Some examples of the above brake assemblies are shown in U.S. Pat. No. 5,070,968 to Evans, and U.S. Pat. No. 5,275,260 to Evans et al., the disclosures of which are incorporated herein.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle drum brake assembly adapted to selectively frictionally engage a brake drum comprising:
    a backing plate supported relative to a vehicle component, said backing plate having at least three openings formed therethrough;
    a one-piece brake shoe supported on said backing plate for selective movement into frictional engagement with the brake drum;
    a brake mechanism disposed adjacent a pair of ends of said brake shoe for selectively moving said brake shoe into frictional engagement with the brake drum;
    a pair of fasteners extending through two of said three openings provided in said backing plate to secure said backing plate to a fixed, non-rotatable component of the vehicle; and
    a single member formed integral as one piece with said one-piece brake shoe, said member having an inner end portion extending through the third of said three openings provided in said backing plate and secured to the fixed, non-rotatable component of the vehicle, wherein during application of the drum brake assembly said member is operative to transfer braking torque from said brake shoe to the non-rotatable component of the vehicle;
    wherein said one-piece brake shoe is provided with a pair of shoe flex slots formed integral as one piece therewith directly adjacent said member on opposed sides thereof, said shoe flex slots operative to space apart portions of said one-piece brake shoe from being directly connected to said member whereby said air of shoe flex slots are operative to provide for at least one of adjustment of the brake output characteristics of the brake assembly and change of the pressure distribution on the friction pad of the brake assembly.

2. The vehicle drum brake assembly according to claim 1 wherein said one-piece brake shoe includes at least one shoe sliding support formed integral as one piece therewith.

3. The vehicle brake drum assembly according to claim 1 wherein said one-piece brake shoe is formed from an aluminum material during a semi-solid forging process.

4. The vehicle brake drum assembly according to claim 1 wherein said one-piece brake shoe is formed from steel, aluminum or a composite material during a casting or a forging process.

5. A brake shoe adapted for use in a vehicle drum brake assembly comprising:

a one-piece brake shoe having a brake torque transmitting singe member formed integral as one piece therewith, wherein during application of the drum brake assembly said member is operative to transfer braking torque from said one-piece brake shoe to a non-rotatable component of the vehicle, and wherein said one-piece brake shoe is provided with a pair of shoe flex slots formed integral as one piece therewith directly adjacent said member on opposed sides thereof, said shoe flex slots operative to space apart portions of said one-piece brake shoe from being directly connected to said member whereby said pair of shoe flex slots are operative to provide for at least one of adjustment of the brake output characteristics of the brake assembly and change of the pressure distribution on the friction pad of the brake assembly.

6. The brake shoe according to claim 5 wherein said member is provided with threads along at least a portion of an inner end portion thereof.

7. The brake shoe according to claim 5 wherein said one-piece brake shoe includes at least one shoe sliding support formed integral as one piece therewith.

8. The brake shoe according to claim 5 wherein said member is provided with threads along at least a portion of an inner end portion thereof and is provided with a pair of shoe flex slots formed integral as one piece therewith adjacent said member to provide for adjustment of the brake output characteristics of the brake assembly and/or change of the pressure distribution on the friction pad of the brake assembly.

9. The brake shoe according to claim 5 wherein said one-piece brake shoe is formed from an aluminum material during a semi-solid forging process.

10. The brake shoe according to claim 5 wherein said one-piece brake shoe is formed from steel, aluminum or a composite material during a casting or a forging process.

11. The brake shoe according to claim 1 wherein said member is provided with threads along at least a portion of said inner end portion.

* * * * *